(12) United States Patent
Nakamura et al.

(10) Patent No.: US 11,039,037 B2
(45) Date of Patent: Jun. 15, 2021

(54) IMAGE PROCESSING APPARATUS, IMAGE FORMING APPARATUS AND IMAGE PROCESSING METHOD FOR IMPROVING EFFICIENCY OF CLIPPING PROCESS

(71) Applicant: KYOCERA Document Solutions Inc., Osaka (JP)

(72) Inventors: Masayoshi Nakamura, Torrance, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/670,913

(22) Filed: Oct. 31, 2019

(65) Prior Publication Data

US 2021/0136253 A1    May 6, 2021

(51) Int. Cl.
*H04N 1/38*     (2006.01)
*H04N 1/387*    (2006.01)
(Continued)

(52) U.S. Cl.
CPC ......... *H04N 1/3872* (2013.01); *G06K 9/0014* (2013.01); *G06T 7/10* (2017.01);
(Continued)

(58) Field of Classification Search
CPC combination set(s) only.
See application file for complete search history.

(56) References Cited

U.S. PATENT DOCUMENTS 10,497,121 B2 * 12/2019 An .................. G06T 7/11

FOREIGN PATENT DOCUMENTS

| JP | 3612909      | * | 1/2005  |
| JP | 2005-275668 A |   | 10/2005 |
| JP | 2009-169584 A |   | 7/2009  |

* cited by examiner

*Primary Examiner* — Barbara D Reinier
(74) *Attorney, Agent, or Firm* — Hawaii Patent Services; Nathaniel K. Fedde; Kenton N. Fedde

(57) ABSTRACT

Provided is an image processing apparatus for improving efficiency of a clipping process. The image processing unit is an image processing apparatus for a raster image processor (RIP) mounted in an image forming apparatus. An order acquiring unit acquires instructions for image processing. A determination unit, in a case where clipping is set according to the instructions acquired by the order acquiring unit, determines whether that clipping is to be in an inclusive mode or an exclusive mode, and in a case of the exclusive mode, calculates pixels that are to be protected in a frame for which image processing is to be performed, and sets a number of pixels necessary for a clipping process. A clip processing unit, in the inclusive mode, in a case where a shape unit for which clipping is to be performed is a rectangle, performs clipping by evaluating a clipping area that includes the shape unit and a frame for which image processing is to be performed, and setting a different frame; and in a case where the shape unit is a trapezoid or a scan line, performs clipping by evaluating a positional relationship between the frame and a line being processed, and setting a different line; and in the exclusive mode, performs clipping by setting a number of pixels calculated by the determination unit without setting a different line, and performing evaluation of the clipping area and each line.

11 Claims, 7 Drawing Sheets

(51) Int. Cl.
*G06K 9/00* (2006.01)
*G06T 7/11* (2017.01)
*G06T 7/13* (2017.01)
*G06T 7/12* (2017.01)
*G06T 7/136* (2017.01)
*G06T 7/187* (2017.01)
*G06T 7/181* (2017.01)
*G06T 7/10* (2017.01)
G06K 15/00 (2006.01)

(52) U.S. Cl.
CPC .................. *G06T 7/11* (2017.01); *G06T 7/12* (2017.01); *G06T 7/13* (2017.01); *G06T 7/136* (2017.01); *G06T 7/181* (2017.01); *G06T 7/187* (2017.01); *H04N 1/38* (2013.01); *G06K 15/4065* (2013.01)

IMAGE PROCESSING APPARATUS, IMAGE FORMING APPARATUS AND IMAGE PROCESSING METHOD FOR IMPROVING EFFICIENCY OF CLIPPING PROCESS

BACKGROUND

The present disclosure relates to an image processing apparatus, an image forming apparatus and an image processing method that performs a clipping process in a Raster Image Processor (RIP).

There are image forming apparatuses such as multifunction peripherals (MFPs) and the like capable of printing documents and images.

In an image forming apparatus, image processing by a Raster Image Processor (RIP) that forms images of page data described in a page description language such as Postscript (registered trademark) and the like is performed.

In this RIP process, a clipping process may be performed. A clipping process is a process of defining a clipping area and clipping an image corresponding to this area.

In a typical clipping process, an inclusive mode and an exclusive mode are set. The difference between these is in the handling of the area outside of the area to be clipped (outside the clipping area) and the handling of the mask bit values.

In the inclusive mode, an image of pixels having a mask bit of 1 is outputted to the memory. On the other hand, in a case where the mask bit is 0, that location is protected and the image is not written to memory. Everything outside the clipping area is protected.

In the exclusive mode, an image of pixels having a mask bit of 0 is outputted to the memory. Conversely, pixels having a mask bit of 1 are protected. In addition, everything outside the clipping area is overwritten in the memory.

SUMMARY

The image processing apparatus according to the present disclosure is an image processing apparatus for a raster image processor (RIP) mounted in an image forming apparatus, including: an order acquiring unit configured to acquire instructions for image processing; a determination unit configured to, in a case where clipping is set according to the instructions acquired by the order acquiring unit, determine whether that clipping is to be in an inclusive mode or an exclusive mode, and in a case of the exclusive mode, calculate pixels that are to be protected in a frame for which image processing is to be performed, and set a number of pixels necessary for a clipping process; and a clip processing unit configured to, in the inclusive mode, in a case where a shape unit for which clipping is to be performed is a rectangle, perform clipping by evaluating a clipping area that includes the shape unit and a frame for which image processing is to be performed, and setting a clip frame where the original frame and the clipping area overlap; and in a case where the shape unit is a trapezoid or a scan line, perform clipping by evaluating a positional relationship between the frame and a line being processed, and setting a clip line; and in the exclusive mode, performs clipping by setting a number of pixels calculated by the determination unit without setting a different line, and performing evaluation of the clipping area and each line.

The image forming apparatus according to the present disclosure is an image forming apparatus that includes an image processing apparatus for a raster image processor (RIP), wherein the image processing apparatus, includes: an order acquiring unit configured to acquire instructions for image processing; a determination unit configured to, in a case where clipping is set according to the instructions acquired by the order acquiring unit, determine whether that clipping is to be in an inclusive mode or an exclusive mode, and in a case of the exclusive mode, calculate pixels that are to be protected in a frame for which image processing is to be performed, and set a number of pixels necessary for a clipping process; and a clip processing unit configured to, in the inclusive mode, in a case where a shape unit for which clipping is to be performed is a rectangle, perform clipping by evaluating a clipping area that includes the shape unit and a frame for which image processing is to be performed, and setting a clip frame where the original frame and the clipping area overlap; and in a case where the shape unit is a trapezoid or a scan line, perform clipping by evaluating a positional relationship between the frame and a line being processed, and setting a clip line; and in the exclusive mode, performs clipping by setting a number of pixels calculated by the determination unit without setting a different line, and performing evaluation of the clipping area and each line.

The image processing method according to the present invention is an image processing method that is executed by an image processing apparatus for a raster image processor (RIP) mounted in an image forming apparatus, comprising steps of: acquiring instructions for image processing; in a case where clipping is set according to the acquired instructions, determining whether that clipping is to be in an inclusive mode or an exclusive mode, and in a case of the exclusive mode, calculating pixels that are to be protected in a frame for which image processing is to be performed, and setting a number of pixels necessary for a clipping process; in the inclusive mode, in a case where a shape unit for which clipping is to be performed is a rectangle, performing clipping by evaluating a clipping area that includes the shape unit and a frame for which image processing is to be performed, and setting a clip frame where the original frame and the clipping area overlap; and in a case where the shape unit is a trapezoid or a scan line, performing clipping by evaluating a positional relationship between the frame and a line being processed, and setting a clip line; and in the exclusive mode, performing clipping by setting a number of pixels calculated without setting a different line, and performing evaluation of the clipping area and each line.

DETAILED DESCRIPTION

Embodiments

[System Configuration of the Image Forming Apparatus 1]

Figure 1:
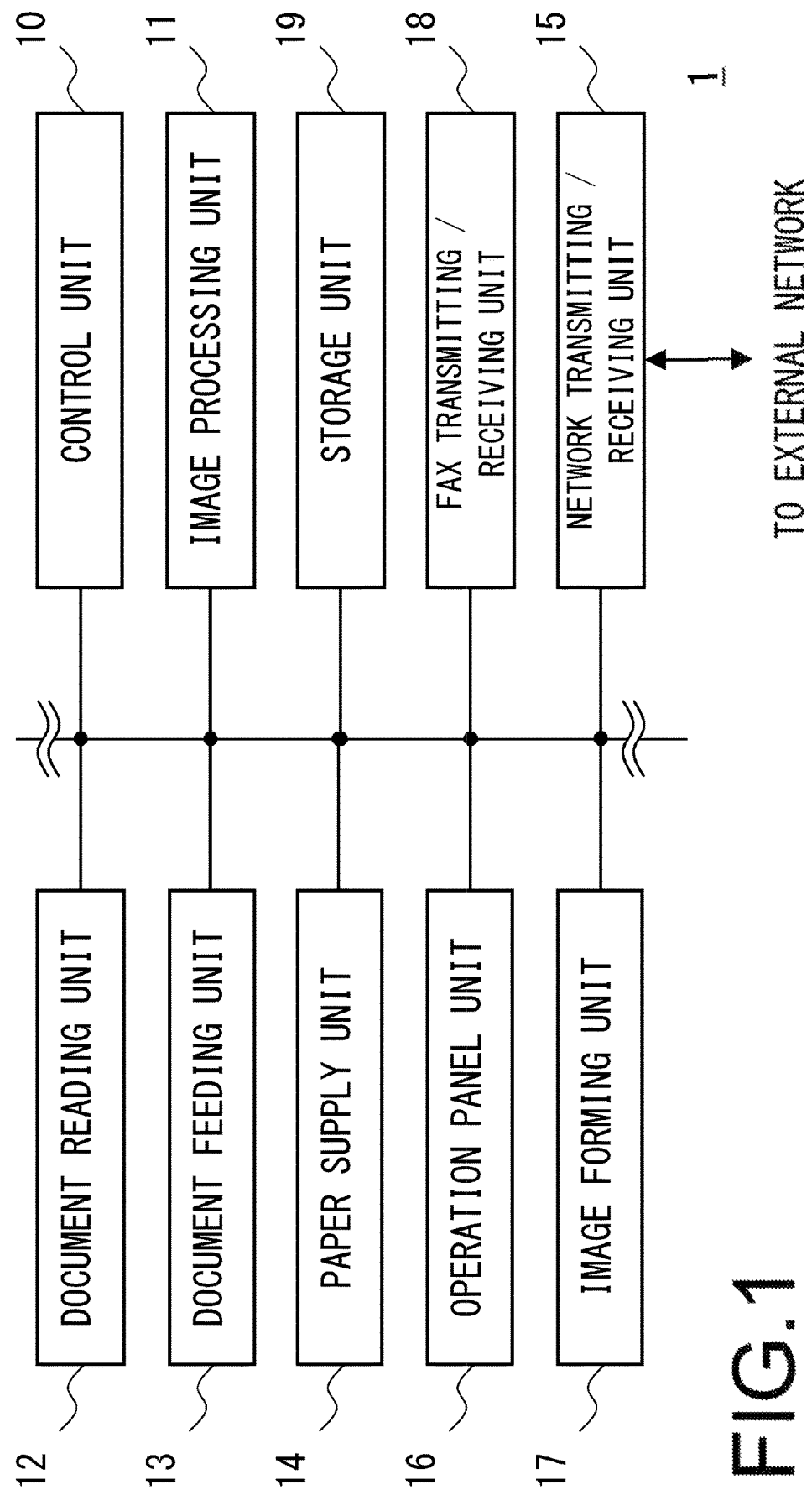
FIG. 1 is a system configuration diagram of an image forming apparatus of an embodiment according to the present disclosure.

First, the system configuration of the image forming apparatus 1 will be described with reference to FIG. 1.

The image forming apparatus 1 includes a image processing unit 11, a document reading unit 12, a document feeding unit 13, a paper supply unit 14, a network transmitting/ receiving unit 15, an operation panel unit 16, an image forming unit 17 (image forming means), a FAX transmitting/receiving unit 18, a storage unit 19 and the like. Each unit is connected to a control unit 10, and the operation is controlled by the control unit 10.

The control unit 10 is an information processing unit such as a general purpose processor (GPP), a central processing unit (CPU), a micro processing unit (MPU), a digital signal processor (DSP), a graphics processing unit (GPU), or the like.

The control unit 10 reads a control program stored in the ROM or the HDD of the storage unit 19, develops the control program in the RAM, and executes the control program. In addition, the control unit 10 performs overall control of the apparatus in accordance with specified instruction information inputted from an external terminal (not illustrated) or the operation panel unit 16.

In the present embodiment, the control unit 10 can execute (accelerate) the RIP process at high speed by the ASIC of the image processing unit 11 described below.

The control unit 10 interprets the page file, creates data called an order list which is a collection of instructions (orders) of RIP processing to be executed by the image processing unit 11, and stores the data in the storage unit 19. Then, the control unit 10 specifies an address at which the order list is arranged in the storage unit 19 and instructs the image processing unit 11 to execute the order list.

The image processing unit 11 is a control calculation means dedicated to image processing and performs specified image processing on image data. The image processing unit 11 is able to perform as the specified image processing, for example, processing such as enlargement/reduction, density adjustment, gradation adjustment, image improvement and the like.

Moreover, the image processing unit 11 stores the image read by the document reading unit 12 in the storage unit 19 as printing data. At this time, the image processing unit 11 is also able to convert the printing data into an electronic document such as PDF or the like, or a image data file such as TIFF or the like. In addition, the image processing unit 11 may be able to execute at least a part of the processing of optical character recognition (OCR).

In the present embodiment, the image processing unit 11 includes an ASIC or the like of a RIP accelerator.

In the RIP of this embodiment, the image processing unit 11 is able to perform image processing for each pixel. In a case where the control unit 10 gives an instruction to execute the order list, the image processing unit 11 reads the order list, performs image processing according to the instructions of the orders included in the order list, and creates band data as drawn image data.

At this time, in the present embodiment, the image processing unit 11 performs the above-mentioned clipping process.

The document reading unit 12 reads a set document. In addition, the document reading unit 12 is arranged on the upper portion of the main body of the image forming apparatus 1.

The document reading unit 12 includes a scanner, a platen glass, and a document reading slit. When reading a document placed on the platen glass, the document reading unit 12 moves the scanner to a position facing the platen glass, reads the document placed on the platen glass while scanning, and acquires image data, then outputs the acquired image data to the control unit 10.

Moreover, when reading documents fed from the document feeding unit 13, the document reading unit 12 moves the scanner to a position facing the document reading slit. Then, the document reading unit 12 reads a document in synchronization with the document feeding operation by the document feeding unit 13 via the document reading slit, and acquires image data. The document reading unit 12 outputs the acquired image data to the control unit 10.

The document feeding unit 13 conveys a document to be read by the document reading unit 12. The document feeding unit 13 is arranged in the upper part of the document reading unit 12.

The document feeding unit 13 includes a document placement unit and a document conveying mechanism. The document feeding unit 13 feeds documents placed on the document placement unit one by one by the document conveying mechanism and feeds the documents to the document reading unit 12.

The paper supply unit 14 feeds recording paper one sheet at a time toward the image forming unit 17. The paper supply unit 14 is provided in the main body.

The network transmitting/receiving unit 15 is a network connecting unit including a LAN board, a wireless transceiver, or the like for connecting to an external network such as a LAN, a wireless LAN, a WAN, a mobile phone network or the like.

The network transmitting/receiving unit 15 transmits and receives data over a line for data communication, and transmits and receives audio signals over a voice telephone line.

The operation panel unit 16 includes an input unit such as buttons, a touch panel and the like, and a display unit such as an Liquid Crystal Display (LCD), an organic EL display or the like. In addition, the operation panel unit 16 is arranged on the front side of the image forming apparatus 1.

The buttons on the input unit of the operation panel unit 16 are a numeric key pad, a start button, a cancel button, an operation mode switch, buttons for performing instructions related to executing a job, and the like. The operation mode may include types of modes such as copying, FAX transmission, scanner, network scanner, and the like. Moreover, a job also includes printing, transmitting, storage, recording, and the like of a selected document. The input unit of the operation panel unit 16 acquires instructions by a user for various jobs of the image forming apparatus 1. Furthermore, it is possible to input or change information of each user according to user instructions acquired from the operation panel unit 16.

The image forming unit 17 performs image formation on recording paper from data stored in the storage unit 19, read by the document reading unit 12, or acquired from an external terminal according to an output instruction from the user.

The image forming unit 17 includes a photosensitive drum, an exposure unit, a developing unit, a transfer unit, a fixing unit, and the like. The image forming unit 17 records a toner image on recording paper by executing an image forming process that includes charging, exposure, development, transfer, and fixing.

The FAX transmitting/receiving unit 18 transmits and receives facsimiles. The FAX transmitting/receiving unit 18 can receive a facsimile from another FAX machine (not illustrated) via a voice line, store the facsimile in the storage unit 19 and cause the image forming unit 17 to form an image. In addition, the FAX transmitting/receiving unit 18 may convert a document read by the document reading unit 12 or the data of a network FAX transmitted from an external terminal into image data, and transmit a facsimile to another FAX machine over a voice line.

The storage unit 19 is a non-transitory recording medium such as a semiconductor memory such as a read only memory (ROM), a random access memory (RAM) or the like, or a hard disk drive (HDD) or the like.

Even in a power saving state, the RAM of the storage unit 19 may hold the stored contents by a function such as self refresh or the like.

Control programs and data for performing operation control of the image forming apparatus 1 and data and the like used by the image processing unit 11 are stored in the ROM and the HDD of the storage unit 19. In addition, the storage unit 19 also stores other data such as user account settings and the like. Moreover, the storage unit 19 may include an area for storage folders for each user.

The storage unit 19 of the present embodiment stores job data and order list data as data used by the image processing unit 11. In addition, when an order list is executed in a RIP process, the storage unit 19 stores band data (pixel data), which is drawn image data.

The job is printing data including page data described in a page description language.

The order list is data obtained by collecting together image processing instructions called orders in which page data in a job is interpreted by the control unit. An order is data related to the RIP process of the present embodiment, and includes an image processing instruction and data for the image processing unit 11. The order list includes a plurality of orders, and the orders are processed sequentially.

In addition, in the present embodiment, an example will be described in which the RAM of the storage unit 19, the control unit 10, and the image processing unit 11 are connected by a dedicated bus having a data bus width of 128 bits.

Note that in the image forming apparatus 1, the control unit 10 and the image processing unit 11 may be integrally formed, such as a CPU with a built-in GPU, a chip-on-module package, an System on a Chip (SOC), or the like.

In addition, the control unit 10 and the image processing unit 11 may have a built-in RAM, ROM, flash memory, or the like.

[Control Configuration of the Image Processing Unit 11]

Figure 2:
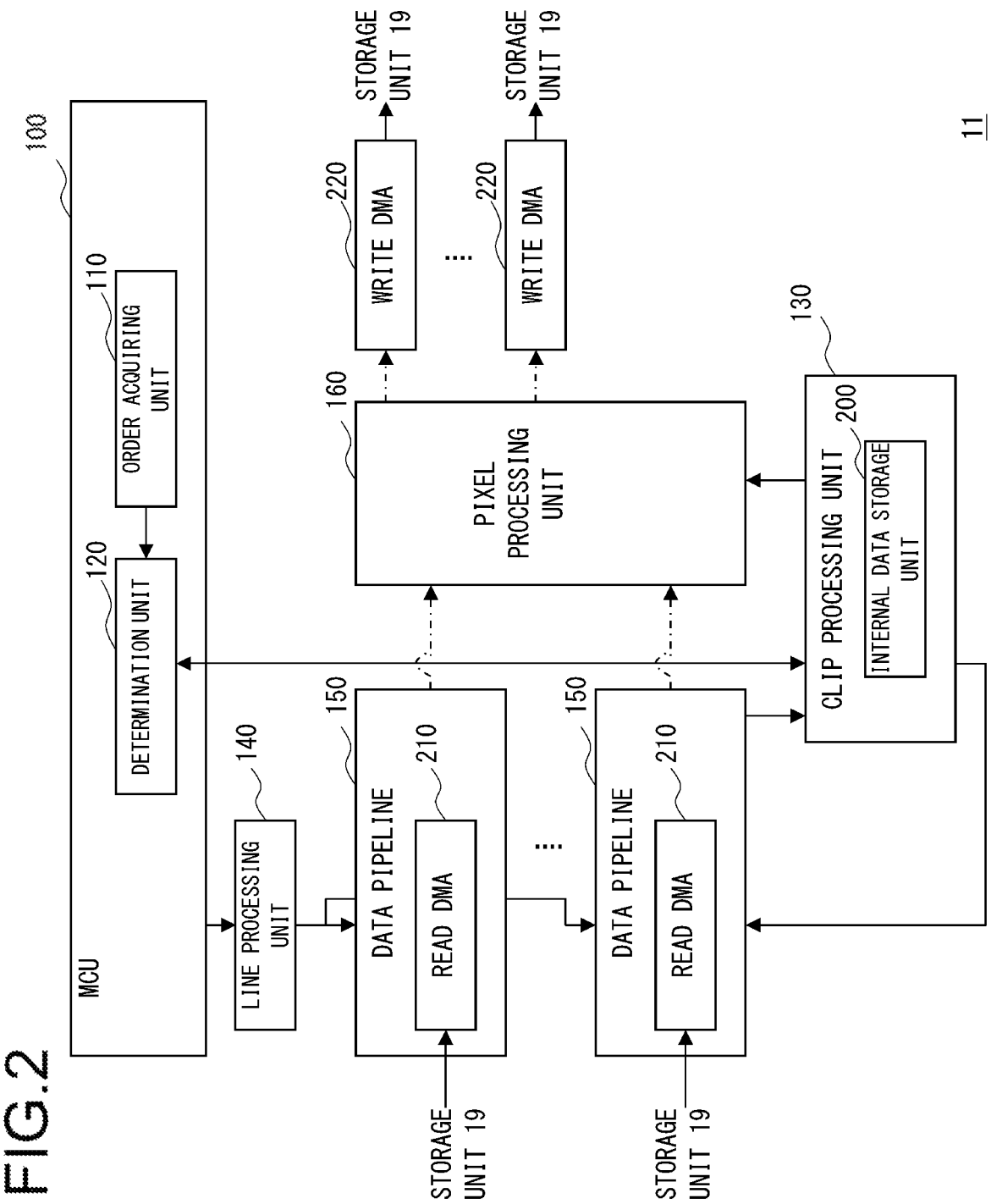
FIG. 2 is a block diagram illustrating a control configuration of the image processing unit illustrated in FIG. 1.
Figure 3:
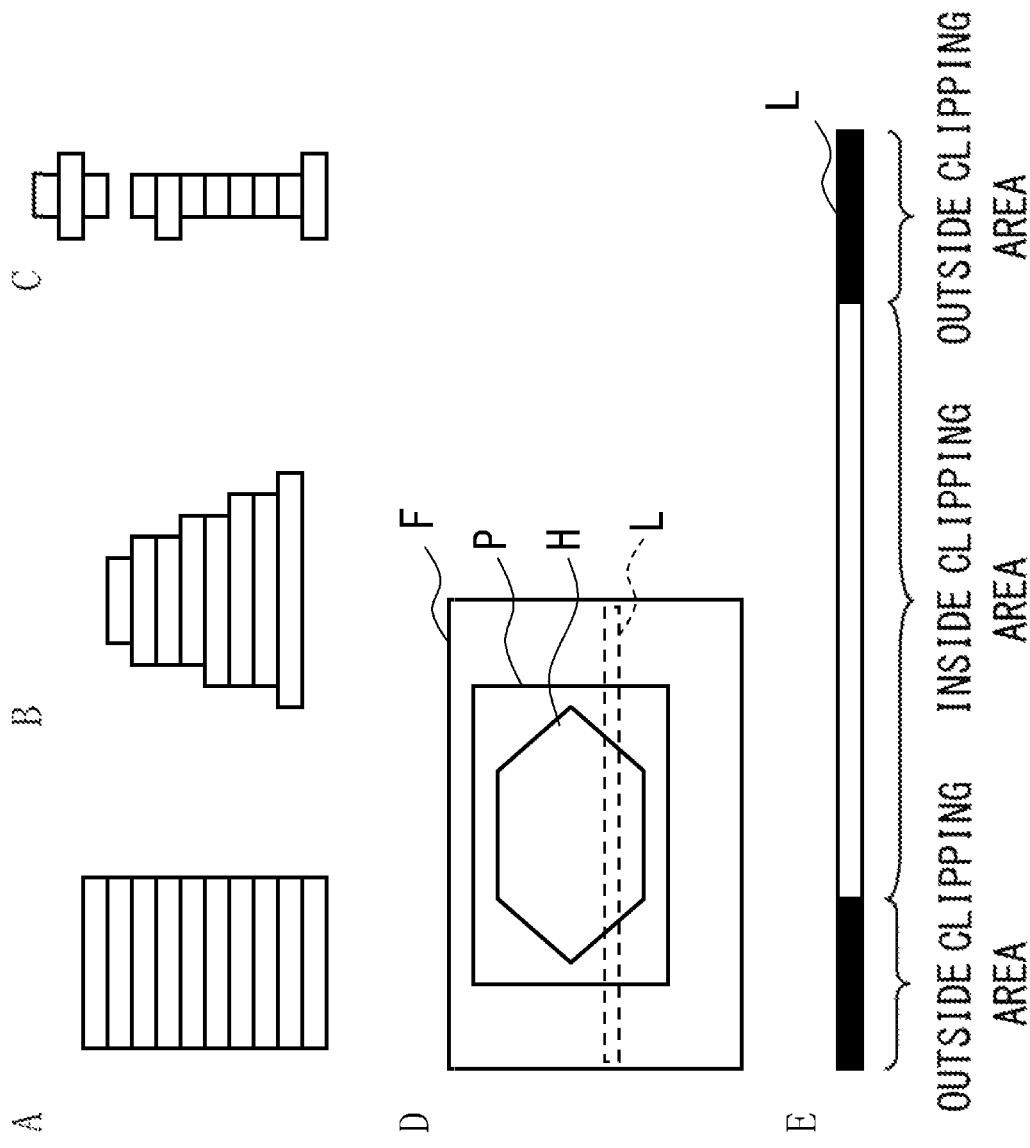
FIG. 3 is a concept diagram of a shape unit of an embodiment according to the present disclosure.

Next, the control configuration of the image processing unit 11 will be described with reference to FIG. 2 and FIG. 3.

The image processing unit 11 includes an MCU 100, a clip processing unit 130, a line processing unit 140, a data pipeline 150, a pixel processing unit 160, and a write DMA 220.

The MCU 100 is an image processing control unit that controls each circuit of the image processing unit 11.

In the RIP process of the present embodiment, the MCU 100 reads an order list from the storage unit 19 and performs processing according to that order list. More specifically, the MCU 100 interprets and executes the orders included in the order list read by the data pipeline 150, and causes other circuits to execute each process corresponding to the orders. This processing includes control of processing of data of the data pipeline 150.

In the present embodiment, the MCU 100 is configured as a general-purpose processor such as a GMCU (General Micro Controller Unit) and the like that is capable of executing preprocessing of a clipping process.

The MCU 100 stores control programs and the like including microcodes and the like for processing each order in a nonvolatile storage unit such as a built-in EEPROM, flash memory or the like. Furthermore, the storage unit that is included in the MCU 100 also includes a temporary data storage area such as a RAM or the like.

The clip processing unit 130 is a circuit for performing an image clipping process. In this clipping process, the clip processing unit 130 is a circuit for clipping (deleting, combining) other images according to a set clipping area.

In the present embodiment, the clip processing unit 130 is configured as a dedicated circuit that reads data of a transfer frame (hereinafter, simply referred to as a "frame"), which is data (image data) indicating a location for which drawing for clipping is to be performed, and executes processing or the like for evaluating clipping.

More specifically, the clip processing unit 130 executes a clipping process using a read DMA 210, the data pipeline 150, and the write DMA 220 in accordance with the address and processing data amount calculated (computed) by the line processing unit 140.

The detailed configuration of the clip processing unit 130 in the present embodiment will be described later.

The line processing unit 140 is a circuit that calculates coordinates of the line process. The line processing unit 140 calculates the address in the storage unit 19 of the shape unit (component) specified by an order at the origin coordinates set by the MCU 100. Details of this shape unit will be described later.

More specifically, in the clipping to be described later, the line processing unit 140 calculates the address in the storage unit 19 and the processing data amount based on the coordinate information (X, Y) from the MCU 100 and the number of pixels in the line. The processing data amount includes the number of pixels (reading amount) required for the clipping process.

The data pipeline 150 is a circuit that reads data from the storage unit 19 and performs processing such as an actual drawing process and the like.

The data pipeline 150 includes a read DMA 210 as a configuration of a reading unit.

The read DMA 210 is Direct Memory Access (DMA) that reads the order list from the storage unit 19.

The read DMA 210, corresponding to a common dedicated bus, performs read of the DMA with the storage unit 19.

The pixel processing unit 160 is a circuit that performs pixel processing. As the pixel processing, the pixel processing unit 160 is able to perform a filtering process such as Boolean (logical) calculation processing (Boolean process), blending, and the like by collecting a plurality of pixels.

The write DMA 220 is a DMA that writes the data of the pixels processed by the pixel processing unit 160 into the storage unit 19 as band data. In this embodiment, this band data is created for each color of, for example, cyan (C), magenta (M), yellow (Y), and black (K).

In this embodiment, an example will be described in which the data width of the data pipeline 150 is 64 bits (dword) or 128 bits (qword).

[Functional Configuration of the MCU 100 and the Clip Processing Unit 130]

Next, functional details of the MCU 100 and the clip processing unit 130 for performing a clipping process will be described.

First, shape units in the RIP process of this embodiment will be described with reference to FIGS. 3A to 3E.

In this embodiment, in an order related to image processing, for example, a shape such as a rectangle, a trapezoid, a scan line or the like is specified as a shape unit. These shape units are used to specify clipping areas. Moreover, drawing to the band data of the storage unit 19 in other orders is also executed in the shape specified by this shape unit. These shapes are sequentially processed for each line based on the address calculated by the line processing unit 140.

Of the shape units described above, the rectangle illustrated in FIG. 3A is a basic shape that has the same length of width for each line.

In the case of the trapezoid illustrated in FIG. 3B, the width of the first line, the inclination of the drawing starting position (left end) of the first line, and the inclination of the drawing ending position (right end) are set. These inclinations are specified, for example, by floating points. In other words, the line width fluctuates in each drawn line according to setting these inclinations.

In the case of the scan line illustrated in FIG. 3C, an arbitrary shape such as a character or the like is drawn by sequentially drawing a scan line list set in a table in the order. In other words, a line having a length calculated from the size specified in the table is drawn line by line. The length and height of the area in which the scan line is drawn can also be set.

FIG. 3D illustrates the relationship between a clipping area P defined by a rectangle and a frame F for which image processing is performed. Frame F indicates one frame included in each band data. A hexagon H in the clipping area P indicates a shape in which clipping is actually performed. In other words, in this embodiment, clip data is set as data including a value for determining pixels to be protected or not. In the example of FIG. 3D, this clip data is set in the shape of a hexagon H in the clipping area P.

FIG. 3E illustrates an example of the determination of clipping for line L that indicates a line in frame F of FIG. 3D. In the present embodiment, the MCU 100 causes the line processing unit 140 to calculate an address for each line, and causes the clip processing unit 130 to execute the clipping process. At this time, the MCU 100 performs a determination for the three areas: an area outside of the clipping area, a area inside the clipping area, and a area outside of the clipping area; and causes the clip processing unit 130 to perform processing in order.

To describe this in detail by referring again to FIG. 2, the MCU 100 includes an order acquiring unit 110 and a determination unit 120.

The clip processing unit 130 includes an internal data storage unit 200.

The order acquiring unit 110 acquires an instruction (order) for image processing. More specifically, the order acquiring unit 110 acquires and interprets an order list generated by the control unit 10 and arranged in the storage unit 19. Then, the order acquiring unit 110 acquires an order included in the order list for a clipping process.

In a case where clipping is set according to the order acquired by the order acquiring unit 110, the determination unit 120 determines whether the clipping is in the inclusive mode or the exclusive mode. In the case of the exclusive mode, the determination unit 120 calculates pixels to be protected in the frame for which image processing is to be performed, and sets the number of pixels necessary for the clipping process in the internal data storage unit 200.

More specifically, the determination unit 120 determines whether or not to transmit the read address of the frame and the processing data amount to the clip processing unit 130 as a clipping area. At this time, the determination unit 120 manages the order of sending the data of the frame so as to be changed by instruction for the pixels not to be protected and an instruction for reading the data of the frame and transmitting the data to the clip processing unit 130. This management is performed by adjusting the order of data in the buffer of data stored in the internal data storage unit 200.

The internal data storage unit 200 is a buffer capable of queuing the instructions of the determination unit 120. More specifically, the internal data storage unit 200 stores, for each shape unit, the order of transmitting an address calculated by the line processing unit 140 and the processing data amount as clipping area data to the clip processing unit 130 as an instruction. Furthermore, for the exclusive mode, the internal data storage unit 200 also includes an instruction for setting the area outside of the clipping area, including the address of the pixels to be protected of the frame and the amount of processing data. In addition, the internal data storage unit 200 also includes reusable calculation result data in line units.

Here, in the inclusive mode, the clip processing unit 130 according to this embodiment, in a case where the clipping area where clipping is to be performed is a rectangle, evaluates the clipping area and the frame for which image processing is to be performed and sets a clip frame, and in a case where the clipping area is a trapezoid or a scan line, evaluates the positional relationship between the frame and the line being processed and sets a clip line. On the other hand, in the exclusive mode, the clip processing unit 130 does not set a clip line, and performs clipping by performing evaluation for each line with the clipping area according to the data calculated by the determination unit 120 and stored in the internal data storage unit 200. More specifically, the clip processing unit 130 sets the number of pixels necessary for image processing based on the data of the protected pixels of the frame included in the instruction for setting the area outside of the clipping area stored in the internal data storage unit 200.

In addition, the clip processing unit 130 may calculate in advance the computation result data in line units, and then may correlated the result data with the instruction and store that result data in the internal data storage unit 200. In this embodiment, the clip processing unit 130 is able to store the evaluation data of the clipping area and the area outside of the clipping area in the internal data storage unit 200. The clip processing unit 130 reads and uses the computation result data at the time of calculation in line units.

[Clipping Process by the Image Forming Apparatus 1]

Next, the clipping process by the image forming apparatus 1 of an embodiment according to the present disclosure will be described with reference to FIG. 3A to FIG. 6F.

When executing the RIP process of this embodiment, the control unit 10 interprets page data and the like of a job stored in the storage unit 19, generates an order list, and arranges the order list in the storage unit 19. Then, the control unit 10 instructs the image processing unit 11 to perform drawing, whereby the clipping process of this embodiment is executed.

In the RIP process of this embodiment, the image processing unit 11, after providing an address in the memory space where the order list stored in the storage unit 19 is arranged to the control unit 10, reads the order list from the storage unit 19 and performs image processing that corresponds to that order list. The order list includes a plurality of orders as described above, and these orders are sequentially processed by the image processing unit 11.

In the clipping process of this embodiment, each circuit of the image processing unit 11 mainly performs execution in cooperation with each unit and using hardware resources.

Figure 4:
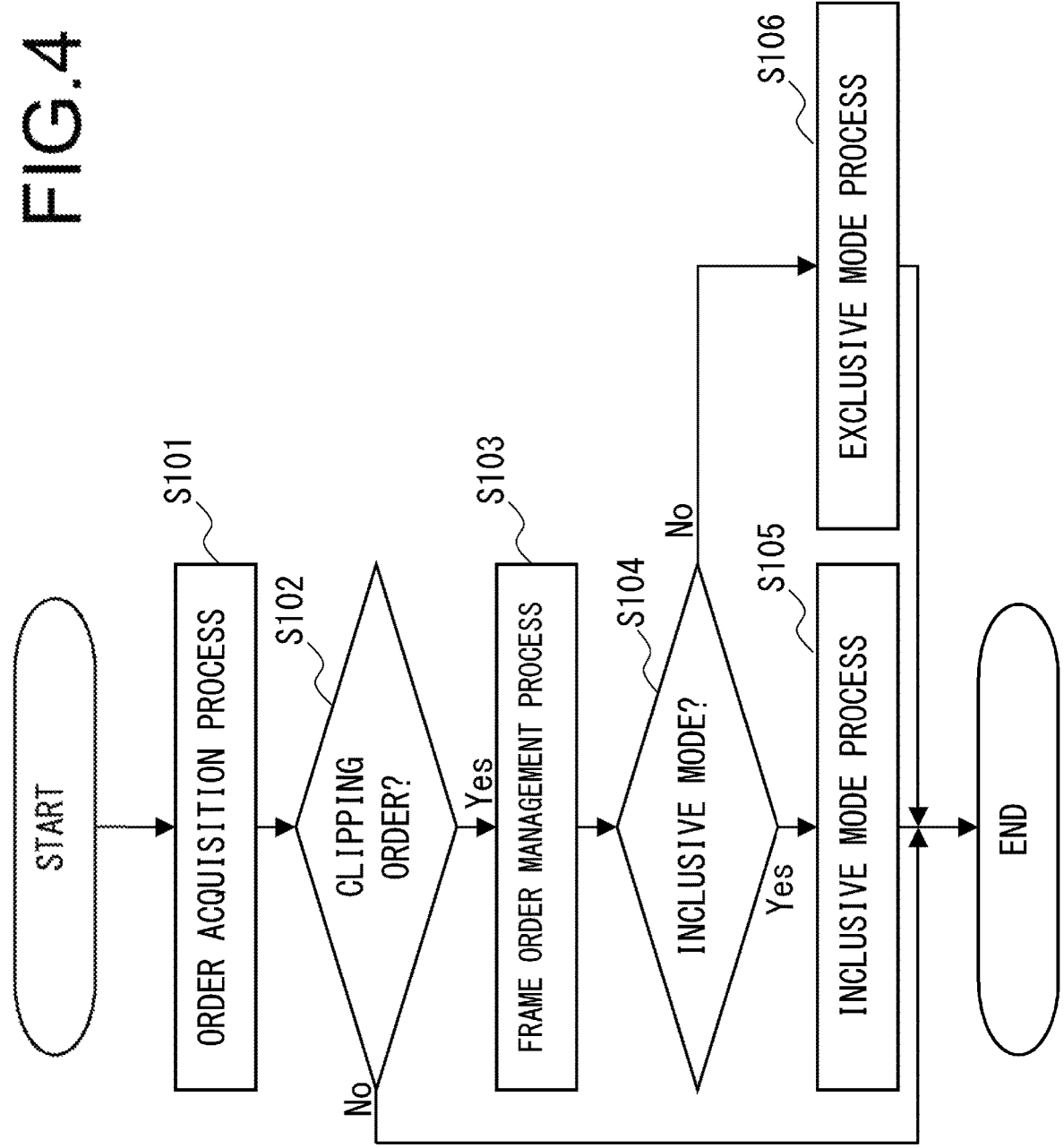
FIG. 4 is a flowchart of a clipping process of an embodiment according to the present disclosure.

Hereinafter, the clipping process of this embodiment will be described in detail step by step with reference to the flowchart in FIG. 4.

(Step S101)

First, the order acquiring unit 110 performs an order acquisition process. The order acquiring unit 110 acquires an order list from the storage unit 19 and sequentially interprets the orders included in the order list. In other words, in this embodiment, preprocessing for clipping is executed by the MCU 100.

(Step S102)

Next, the determination unit 120 determines whether or not the order is a clipping order which is a clipping process. The determination unit 120 determines YES when clipping is set according to the interpreted order. The determination unit 120 determines NO in all other cases.

In the case of YES, the determination unit 120 advances the process to step S103.

In the case of NO, the determination unit 120 ends the clipping process of this embodiment.

(Step S103)

In the case of a clipping setting, the determination unit 120 performs a frame order management process.

The determination unit 120 interprets the order, and causes the line processing unit 140 to calculate the read address of the frame and read amount (amount of data to be processed) for each shape unit. In other words, the line processing unit 140 calculates an address in the storage unit 19 corresponding to the coordinates of these shape units as a location to be written as a frame. The determination unit 120 determines the order of transmitting the calculated address and read amount to the clip processing unit 130 as a clipping area, and queues instructions in the internal data storage unit 200 in accordance with this order.

More specifically, in the inclusive mode or the exclusive mode described above, the determination unit 120 manages the order of sending the frame data according to an order for the pixels not to be protected and an order for reading the frame data and transmitting the data to the clip processing unit 130. For example, the determination unit 120 manages the order for the calculation result by the line processing unit 140 that is used for computation in line units by performing in advance calculations that can be performed beforehand.

To describe this in more detail, as described above, in the exclusive mode, in the area outside of the clipping area, the image processing result is written in a frame of the storage unit 19 and reflected. Therefore, first, the determination unit 120 causes the clip processing unit 130 to create an instruction to perform a setting so as not to protect the pixels in the frame outside of the clipping area, and stores the instruction in the internal data storage unit 200. The determination unit 120 instructs the clip processing unit 130 based on the instruction stored in the internal data storage unit 200. In other words, the determination unit 120 is able to perform a setting for the address of the unprotected location and the number of pixels (amount of data to be processed).

Furthermore, the determination unit 120 also sets as a clipping area the data for how many pixels from which address to read as a clipping area and stores that data in the internal data storage unit 200, and instructs the clip processing unit 130 based on this data.

With this kind of configuration, the determination unit 120 is able to manage the order of sending out data by the instruction stored in the internal data storage unit 200 by the instruction for unprotected pixels, and the instruction for reading the data and transmitting the data to the clip processing unit 130.

(Step S104)

Next, the determination unit 120 determines whether or not the clipping setting is for the inclusive mode. The determination unit 120 determines YES when in the inclusive mode. The determination unit 120 determines NO in any other case, or in other words, when in the exclusive mode.

In the case of YES, the determination unit 120 advances the process to step S105.

In the case of NO, the determination unit 120 advances the process to step S106.

(Step S105)

In the case of the inclusive mode, the clip processing unit 130 performs inclusive mode processing.

In the inclusive mode, when the clipping area for which clipping is to be performed is a rectangle, the clip processing unit 130 evaluates a frame (original frame) and a clipping area to be read in order to perform image processing, and sets a clip frame where the original frame and the clipping area overlap.

The process in a case in the inclusive mode where the shape unit is a rectangle will be described with reference to FIG. 5.

In the inclusive mode, outside of the clipping area is protected, so there is no need to read band data of other locations. By reducing the reading of data that does not affect the output, the load on the bus related to reading between the storage unit 19 and the image processing unit 11 can be reduced, and efficient processing can be performed.

Figure 5:
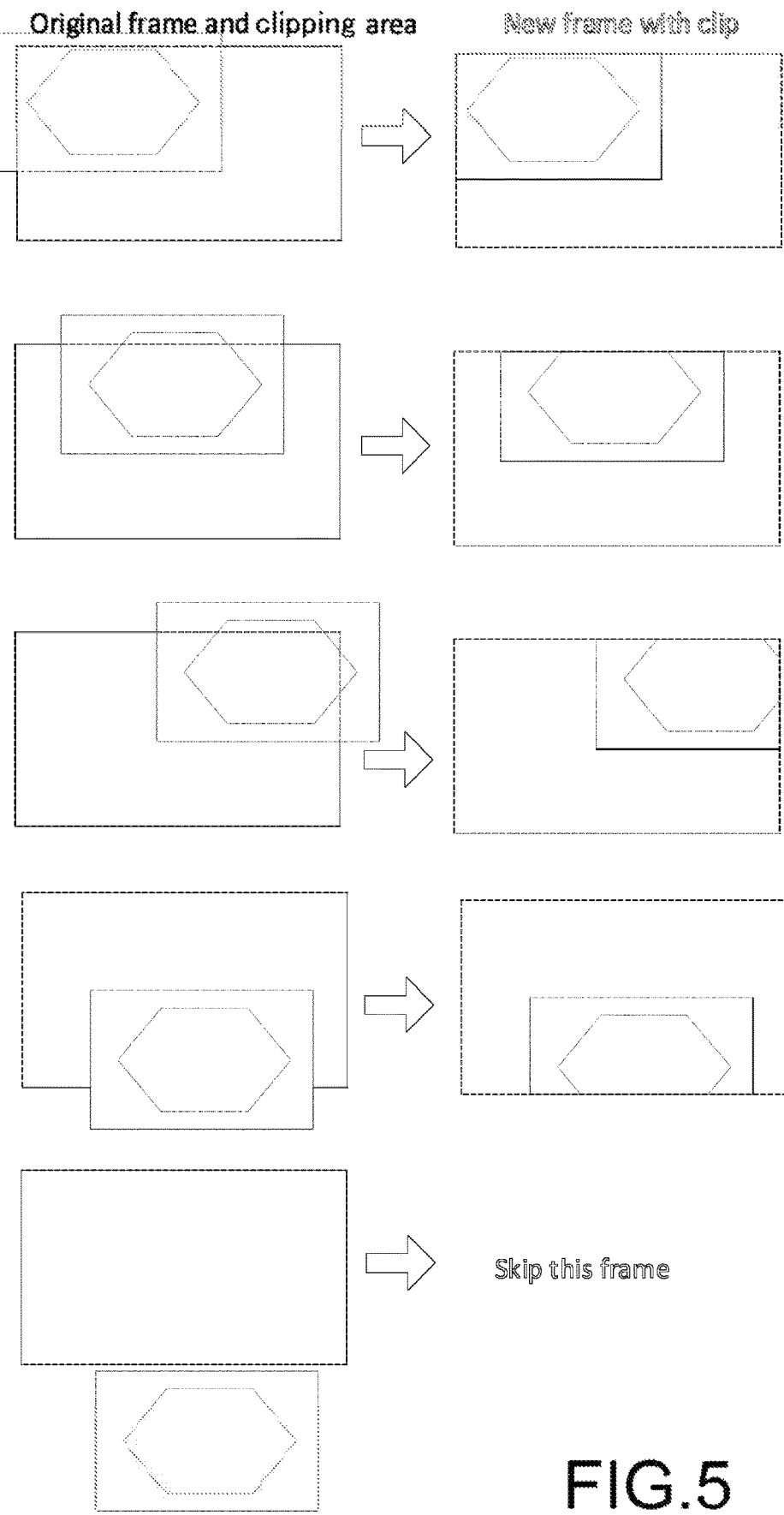
FIG. 5 is a concept diagram of the inclusive mode process illustrated in FIG. 4.

More specifically, as illustrated in FIG. 5, the clip processing unit 130 evaluates the original frame and the clipping area, and creates and writes to a new frame in a clipped state.

Figure 6:
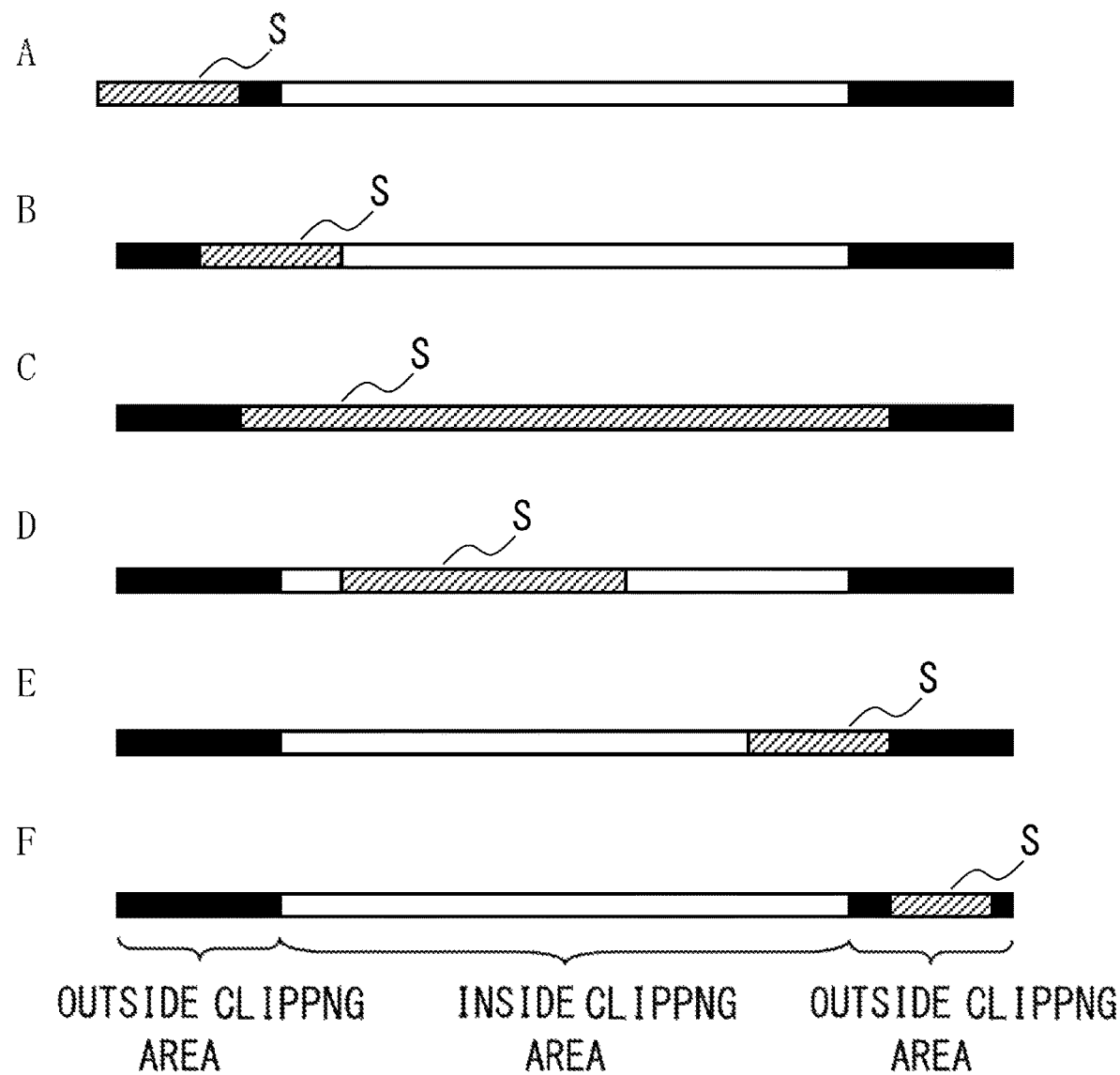
FIG. 6 is a concept diagram of a scan line or a trapezoid in the inclusive mode process illustrated in FIG. 4.

Processing in a case where the shape unit is a scan line or a trapezoid in the inclusive mode will be described with reference to FIG. 6.

In a case where the shape unit is a trapezoid and a scan line in the inclusive mode, the clip processing unit 130 evaluates the positional relationship between the frame and the line being processed and sets a clip line.

More specifically, in the case of a trapezoid or scan line, the position and length differ for each line, so the clipping processing unit 130 does not set a Clip frame as in the case of a rectangle, and performs evaluation of each line and the location S of the shape unit to be clipped.

At this time, as illustrated in FIGS. 6A to 6F, the clip processing unit 130 determines for each line whether or not the location S of the shape unit to be clipped is inside of the clippimg area, or in other words, overlaps. The clip processing unit 130 can skip the line if there is no overlap. Alternatively, in a case where there is partial overlapping, the clip processing unit 130 evaluates the locations for the overlapping location S, and skips only the reading of the pixels of a non-overlapping location S.

In this way, since the clip processing unit 130 omits the reading of unnecessary pixels, it is possible to reduce the load on the bus related to reading between the storage unit 19 and the image processing unit 11.

(Step S106)

In the case of the exclusive mode, the clip processing unit 130 performs exclusive mode processing.

In the exclusive mode, the clip processing unit 130 transmits the pixels to be protected of the frame to the determination unit 120, and sets the number of pixels necessary for image processing.

Figure 7:
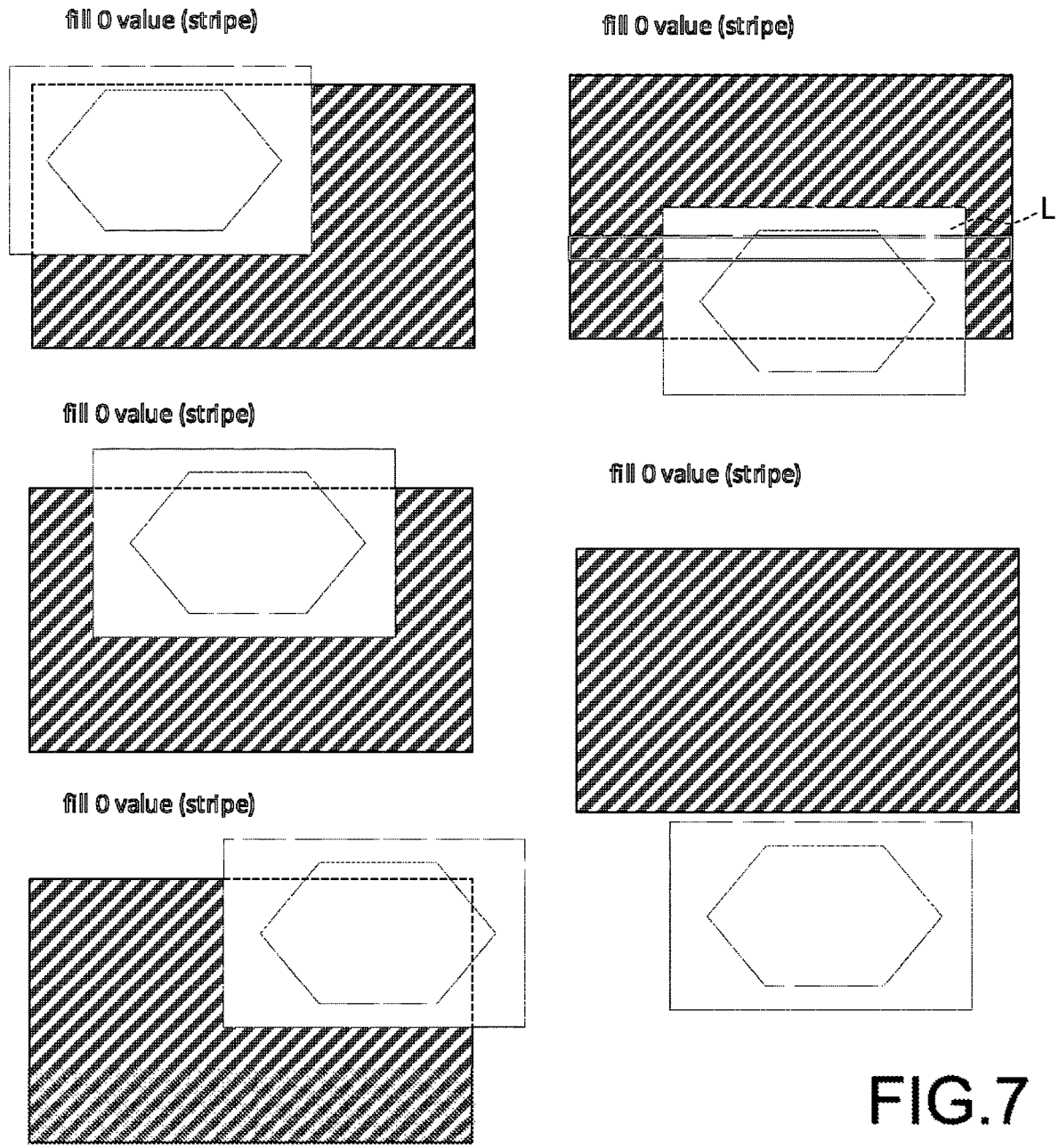
FIG. 7 is a concept diagram of the exclusive mode process illustrated in FIG. 4.

The processing in a case where the shape unit is a rectangle in the exclusive mode will be described with reference to FIG. 7.

In the exclusive mode, the image processing result is reflected in the memory even for areas outside of the clipping area. In FIG. 7, locations in the frame in which the pixels are reflected are indicated by hatching (stripes).

In other words, in the exclusive mode, it is not necessary to set and output a clip frame and line as in the inclusive mode described above. Therefore, in the case of the exclusive mode, the clip processing unit 130 performs processing in line units even in processing of a rectangle. In other words, the clip processing unit 130 evaluates and processes the clipping area for the locations to be clipped in line units even in the case of a rectangle. At this time, the clip processing unit 130 performs this evaluation based on the address of the clipping area the read amount stored in the internal data storage unit 200. More specifically, for each line L, the clip processing unit 130, as illustrated in FIG. 3E described above, performs processing by evaluating three areas: outside of the clipping area, inside of the clipping area, and outside of the clipping area. In other words, the clip processing unit 130 reads an instruction indicating the area outside of the clipping area stored in the internal data storage unit 200, and performs an evaluation of the clipping area and each line according to the setting for the address and the number of pixels to be clipped. At this time, the clip processing unit 130 fills the mask bits of the areas outside of the clipping area with "0" to indicate that the image processing results are to be reflected in the memory.

On the other hand, even in a case where the shape unit is a scan line or a trapezoid in the exclusive mode, similarly, the clipping area and outside of the clipping area are evaluated and processed for the location to be clipped in line units. In a case of a scan line or trapezoid, the line width is not fixed, so processing is performed for each line.

In the inclusive mode and the exclusive mode, the clip processing unit 130 can store the computation result data of each line in the internal data storage unit 200 and can reuse the data as appropriate.

With this, the clipping process of an embodiment according to the present disclosure is completed.

By using the configuration described above, the following effects may be obtained.

In a typical technique, the same clipping process is performed in both the inclusive mode and the exclusive mode, so the efficiency is low.

On the other hand, the image processing unit 11 of an embodiment according to the present disclosure is an image processing apparatus for a raster image processor (RIP) mounted in an image forming apparatus and includes: an order acquiring unit 110 for acquiring orders that are instructions for image processing; a determination unit 120 that, in a case where clipping is set according to an instruction acquired by the order acquiring unit 110, determines whether that clipping is to be in an inclusive mode or an exclusive mode, and in a case of the exclusive mode, calculates pixels that are to be protected in a frame for which image processing is to be performed, and sets a number of pixels necessary for a clipping process; and a clip processing unit 130 that in the inclusive mode, in a case where a shape unit for which clipping is to be performed is a rectangle, performs clipping by evaluating a clipping area that includes the shape unit and a frame for which image processing is to be performed, and setting a clip frame where the original frame and the clipping area overlap; and in a case where the shape unit is a trapezoid or a scan line, performs clipping by evaluating a positional relationship between a frame and a line being processed, and setting a clip line; and in the exclusive mode, performs clipping by setting a number of pixels calculated by the determination unit 120 without setting a clip line, and performing evaluation of the clipping area and each line.

By using this kind of configuration, it is possible to provide an image processing unit 11 capable of performing optimum processing in both the inclusive mode and the exclusive mode.

More specifically, in the inclusive mode, in a case where the shape unit is a rectangle, it is possible to set a clip frame, and in the case of a scan line and a trapezoid, it is possible to evaluate the positional relationship between the clipping area and the pixels being processed for each line, and omit reading unnecessary pixels. In this way, the processing speed can be increased by not reading the unnecessary pixels. Moreover, since unnecessary transactions are not generated for the system bus, the system performance can be improved.

Furthermore, in the exclusive mode and outside of the clipping area, since the processing result is written in the storage unit 19 and reflected, it is possible to set those pixels so as to be unprotected.

In addition, it is possible to perform optimal processing in the exclusive mode by sequentially performing an evaluation of the clipping area based on the address and the processing data amount stored in the internal data storage unit 200.

In the image processing unit 11 of an embodiment according to the present disclosure, the determination unit 120 determines whether to transmit the read address of the frame and the read amount to the clip processing unit 130 as a clipping area, and manages the order of sending out frame data by an instruction for unprotected pixels and by an instruction for reading frame data and transmitting that data to the clip processing unit 130.

With this kind of configuration, it is possible to reduce the calculation load in line units, and to realize high-speed processing. Furthermore, when the clip processing unit 130 is processing one line, the determination unit 120 can perform processing for other lines first.

Incidentally, in a case where there is no longer empty space in a buffer of the internal data storage unit 200, the determination unit 120 may be set to a waiting state.

In the image processing unit 11 of an embodiment according to the present disclosure, the determination unit 120 is configured by a MCU 100 that is a general-purpose processor capable of executing preprocessing, and the clip processing unit 130 is a dedicated circuit that executes processing that includes reading of frame data; wherein the dedicated circuit includes an internal data storage unit 200 that includes a buffer capable of queuing instructions of the determination unit 120.

With this kind of configuration, preprocessing is performed by the MCU 100, the actual clipping process is performed by the dedicated circuit, and the dedicated circuit includes an internal data storage unit 200 that includes a buffer capable of queuing instructions of the MCU 100. As a result, it is possible to absorb a delay that is generated by reading an image, a delay caused by the clip processing, and the like, and to optimize the processing.

In the image processing unit 11 of an embodiment according to the present disclosure, the clip processing unit 130 stores in advance computation result data in calculable line units in the internal data storage unit 200, and reads out and uses the data during calculation in the line units.

With this kind of configuration, calculation results that are used in calculation in line units and can be calculated in advance can be stored in the internal data storage unit 200.

As a result, the calculation load in line units can be reduced and high speed processing can be realized.

Moreover, the image forming apparatus 1 of an embodiment according to the present disclosure is an image forming apparatus including an image processing unit 11 for a raster image processor (RIP).

With this kind of configuration, it is possible to provide an image forming apparatus that increases the speed of a RIP process.

Other Embodiments

Note that part or an arbitrary combination of the functional configurations described above may be configured by programmable logic, a field-programmable gate array (FPGA), or the like other than an ASIC.

Moreover, the technique according to the present disclosure may also be applied to an information processing apparatus other than an image forming apparatus. For example, the technique may be used for a network scanner, a server to which a scanner is separately connected by USB or the like, a PC (Personal Computer), a portable terminal, and the like. Furthermore, the technique may also be used for ASIC such as for color electronic paper, a projector, or the like.

In addition, it goes without saying that the configuration and operation of the above-described embodiments are examples and can be appropriately changed and executed without departing from the scope of the present disclosure.

What is claimed is:

1. An image processing apparatus for a raster image processor (RIP) mounted in an image forming apparatus, comprising:
    an order acquiring unit configured to acquire instructions for image processing;
    a determination unit configured to, in a case where clipping is set according to the instructions acquired by the order acquiring unit, determine whether the clipping is to be in an inclusive mode or an exclusive mode, and in a case of the exclusive mode, calculate pixels that are to be protected in a frame for which image processing is to be performed, and set a number of pixels necessary for a clipping process; and
    a clip processing unit configured to,
    in the inclusive mode, in a case where a shape for which clipping is to be performed is a rectangle, perform clipping by evaluating a clipping area that includes the shape and a frame for which image processing is to be performed, and setting a clip frame where the original frame and the clipping area overlap; and in a case where the shape is a trapezoid or a scan line, perform clipping by evaluating a positional relationship between the frame and a line being processed, and setting a clip line; and
    in the exclusive mode, perform clipping by setting a number of pixels calculated by the determination unit without setting a different line, and performing evaluation of the clipping area and each line.

2. The image processing apparatus according to claim 1, wherein
    the determination unit is configured to
    determine whether to transmit the read address of the frame and the read amount to the clip processing unit as the clipping area, and manage the order of sending out frame data by an instruction for unprotected pixels and an instruction for reading frame data and transmitting that data to the clip processing unit.

3. The image processing apparatus according to claim 1, wherein
    the determination unit is configured by a general-purpose processor capable of executing preprocessing, and
    the clip processing unit is a dedicated circuit that executes processing that includes reading of frame data; wherein
    the dedicated circuit includes an internal data storage unit that includes a buffer capable of queuing the instructions of the determination unit.

4. The image processing apparatus according to claim 3, wherein
    the clip processing unit configured to
    store in advance calculation result data in calculable lines in the internal data storage unit, and read out and use the data during calculation in the lines.

5. An image forming apparatus that includes an image processing apparatus for a raster image processor (RIP), wherein
    the image processing apparatus, comprises:
    an order acquiring unit configured to acquire instructions for image processing;
    a determination unit configured to, in a case where clipping is set according to the instructions acquired by the order acquiring unit, determine whether the clipping is to be in an inclusive mode or an exclusive mode, and in a case of the exclusive mode, calculate pixels that are to be protected in a frame for which image processing is to be performed, and set a number of pixels necessary for a clipping process; and
    a clip processing unit configured to,
    in the inclusive mode, in a case where a shape for which clipping is to be performed is a rectangle, perform clipping by evaluating a clipping area that includes the shape and a frame for which image processing is to be performed, and setting a clip frame where the original frame and the clipping area overlap; and in a case where the shape is a trapezoid or a scan line, perform clipping by evaluating a positional relationship between the frame and a line being processed, and setting a clip line; and
    in the exclusive mode, perform clipping by setting a number of pixels calculated by the determination unit without setting a different line, and performing evaluation of the clipping area and each line.

6. The image forming apparatus according to claim 5, wherein
    the determination unit is configured to
    determine whether to transmit the read address of the frame and the read amount to the clip processing unit as the clipping area, and manage the order of sending out frame data by an instruction for unprotected pixels and an instruction for reading frame data and transmitting that data to the clip processing unit.

7. The image forming apparatus according to claim 5, wherein
    the determination unit is configured by a general-purpose processor capable of executing preprocessing, and
    the clip processing unit is a dedicated circuit that executes processing that includes reading of frame data; wherein
    the dedicated circuit includes an internal data storage unit that includes a buffer capable of queuing the instructions of the determination unit.

8. The image forming apparatus according to claim 7, wherein
the clip processing unit is configured to
store in advance calculation result data in calculable lines in the internal data storage unit, and read out and use the data during calculation in the lines.

9. An image processing method that is executed by an image processing apparatus for a raster image processor (RIP) mounted in an image forming apparatus, comprising steps of:
acquiring instructions for image processing;
in a case where clipping is set according to the acquired instructions, determining whether the clipping is to be in an inclusive mode or an exclusive mode, and in a case of the exclusive mode, calculating pixels that are to be protected in a frame for which image processing is to be performed, and setting a number of pixels necessary for a clipping process;
in the inclusive mode, in a case where a shape for which clipping is to be performed is a rectangle, performing clipping by evaluating a clipping area that includes the shape and a frame for which image processing is to be performed, and setting a clip frame where the original frame and the clipping area overlap; and in a case where the shape is a trapezoid or a scan line, performing clipping by evaluating a positional relationship between the frame and a line being processed, and setting a clip line; and
in the exclusive mode, performing clipping by setting a number of pixels calculated without setting a different line, and performing evaluation of the clipping area and each line.

10. The image processing method according to claim 9, wherein the method comprises
determining whether to transmit the read address of the frame and the read amount to the clip processing unit as the clipping area, and
managing the order of sending out frame data by an instruction for unprotected pixels and an instruction for reading frame data and transmitting that data to the clip processing unit.

11. The image processing method according to claim 9, wherein the method comprises
storing in advance calculation result data in calculable lines in the internal data storage unit, and
reading out and using the data during calculation in the lines.

* * * * *